Jan. 21, 1941.  L. LACHER  2,229,214
SAWING MACHINE
Filed Sept. 3, 1936  3 Sheets-Sheet 1
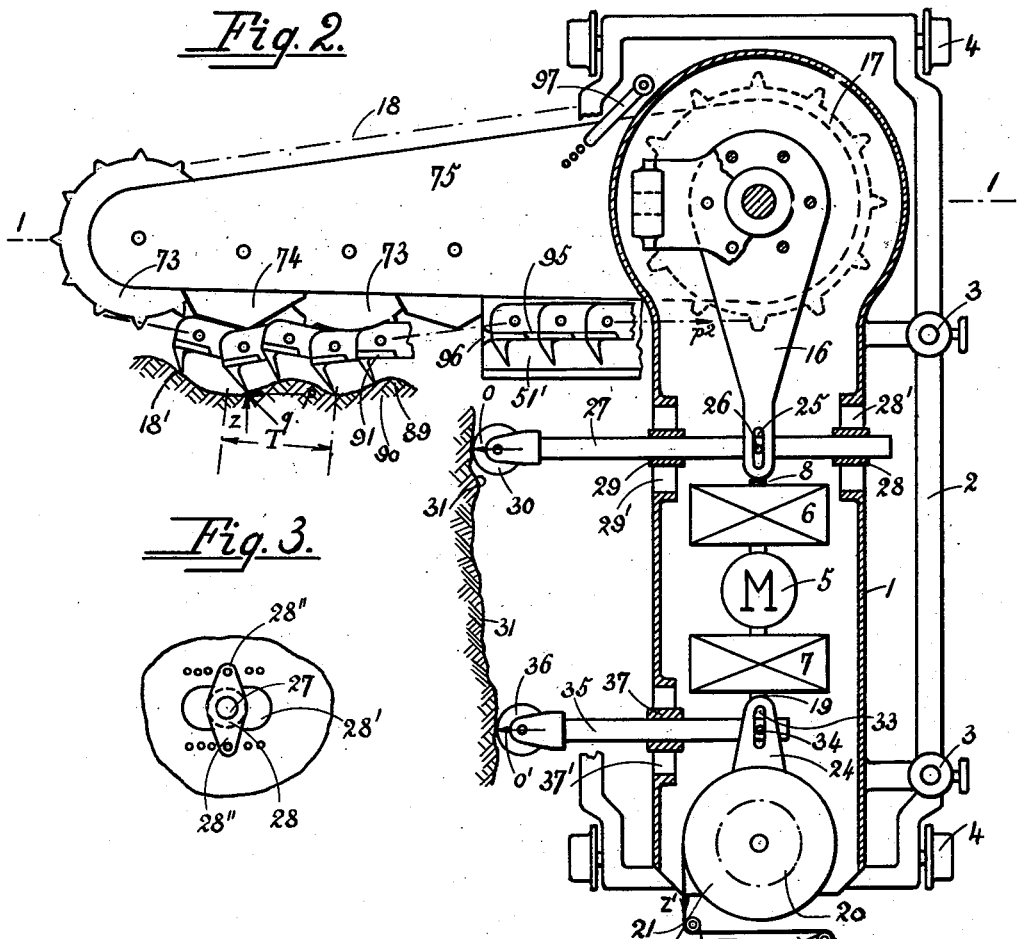
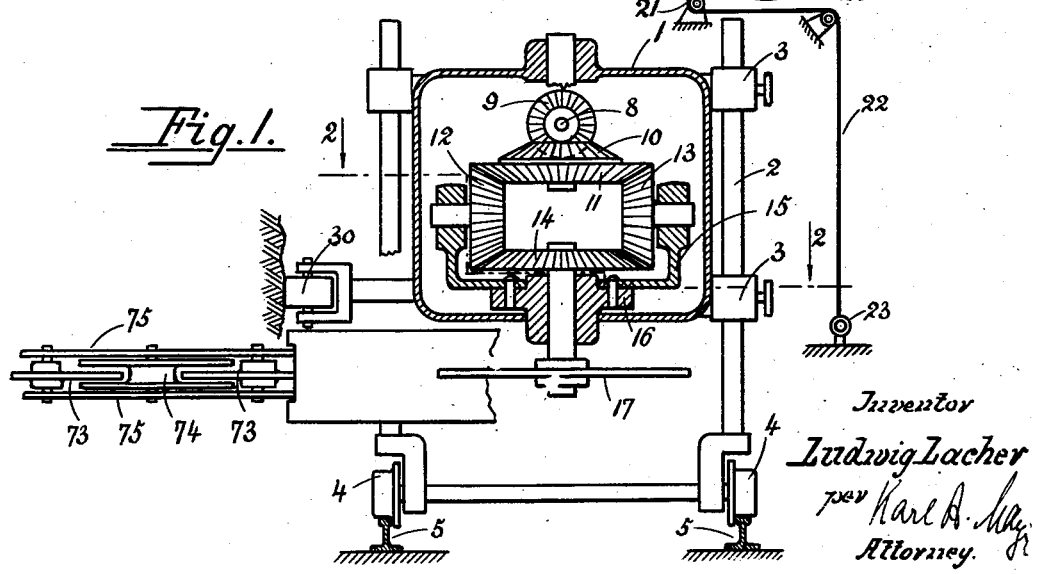
Inventor
Ludwig Lacher
per Karl A. May
Attorney.

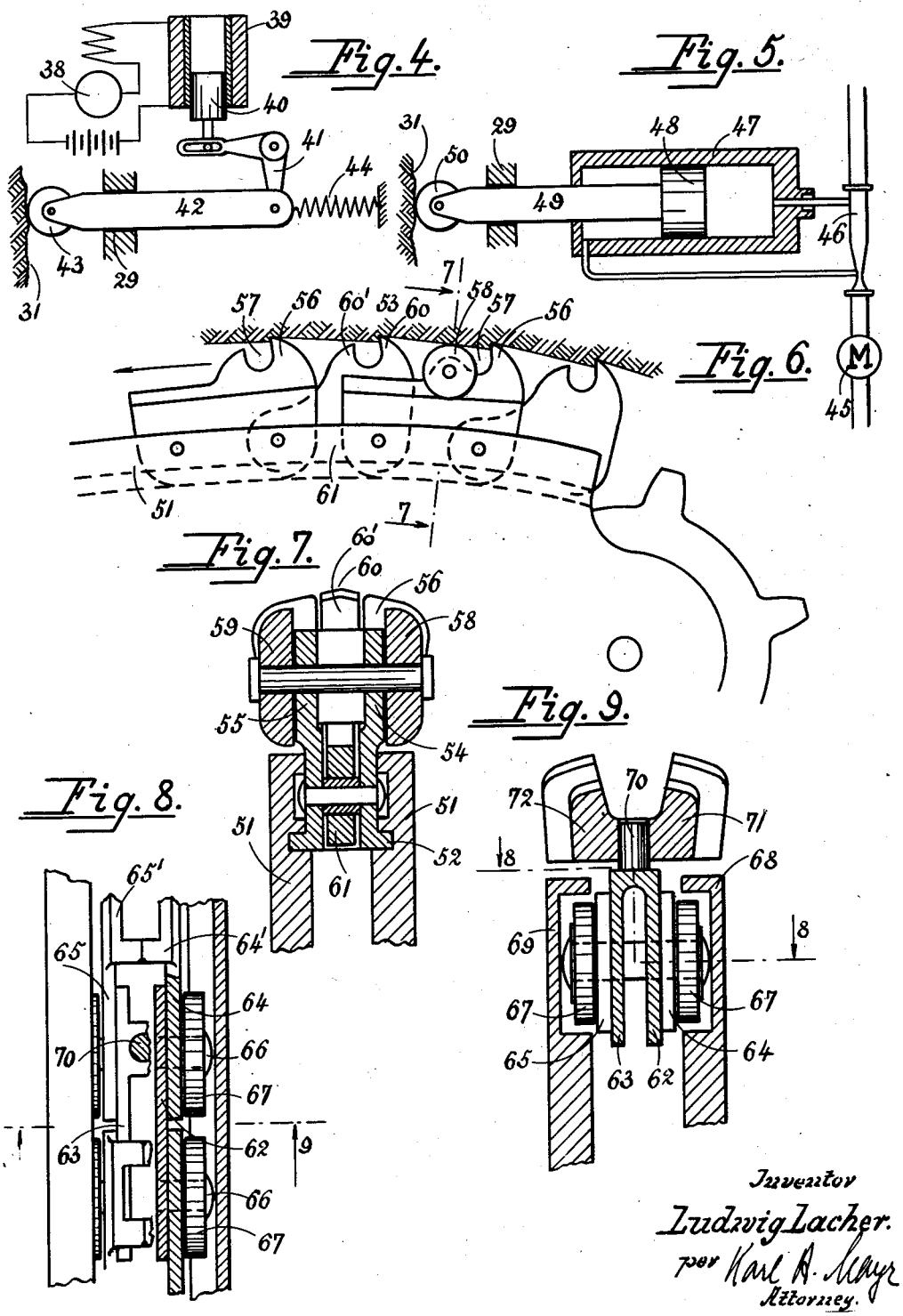

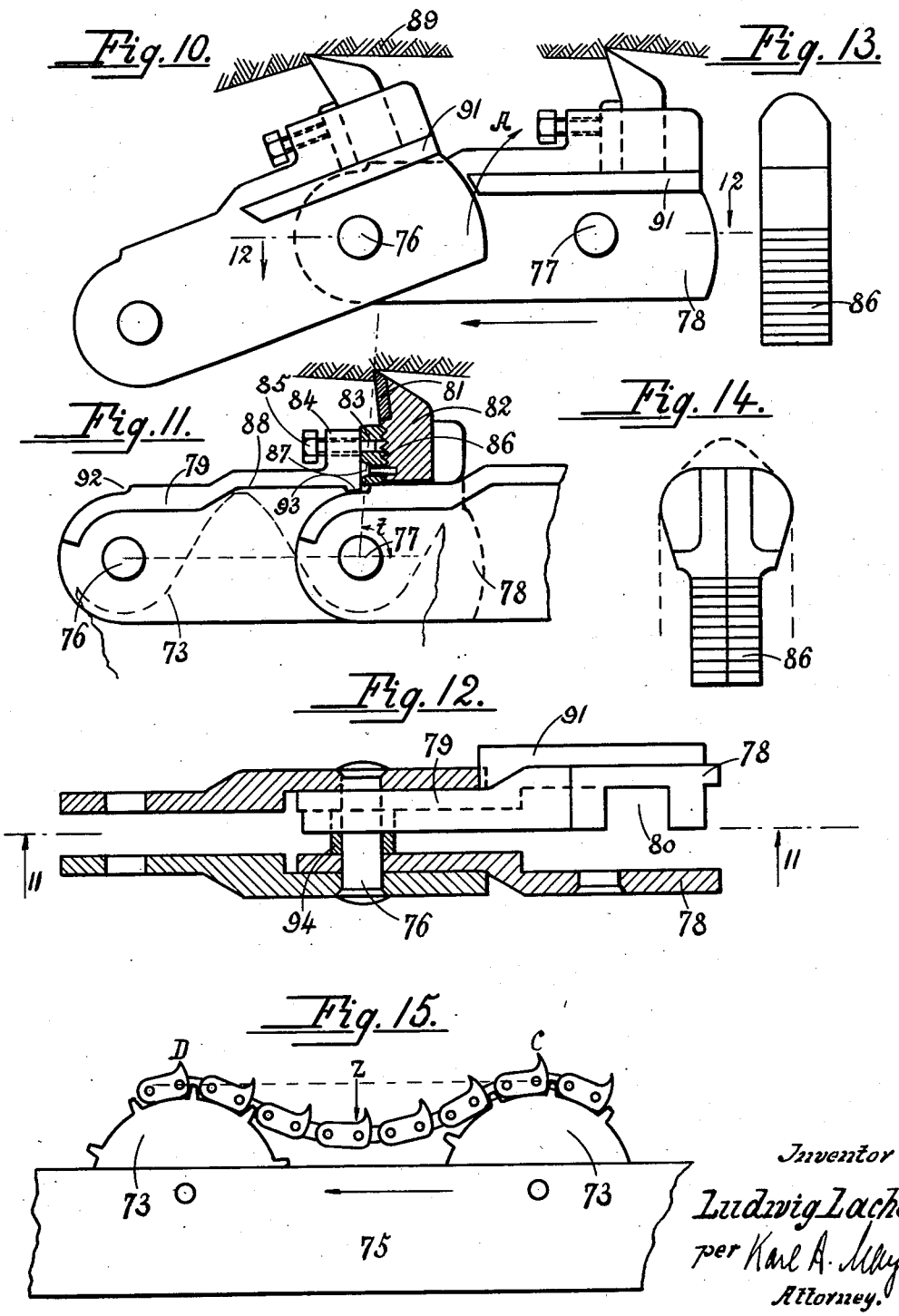

Patented Jan. 21, 1941

2,229,214

UNITED STATES PATENT OFFICE 2,229,214

SAWING MACHINE

Ludwig Lacher, Munich, Germany

Application September 3, 1936, Serial No. 99,195
In Germany September 6, 1935

17 Claims. (Cl. 262—30)

The present invention relates to a sawing or cutting machine, particularly for sawing ice, ground, rock, stone, coal, wood or the like at high speed and high pressure and having a far-reaching, freely movable arm for carrying the cutting tools.

It is an object of the present invention to provide a machine of the type specified which operates at great cutting pressure and which can be efficiently used for cutting materials such as sandstone which have a great wearing effect on the cutting machine.

Another object of this invention resides in the provision of a machine of the type specified which operates quietly and smoothly and at high speed also when cutting hard materials and materials of varying hardness.

A further object of the present invention is to provide a machine for sawing or cutting, whereby the machine is abuttingly held against the material to be worked by means which are movably connected with the main machine body and which are operated or controlled by the same source of power which also supplies power to the cutting tool, whereby the abutting forces are automatically accommodated to the varying cutting resistances and loads on the machine. In the case of a mechanical drive of the cutting machine preferably a rotating gear system, for example, a differential gear system is used having at least two free driving parts one of which serves for driving the cutting tool or the advance mechanism of the machine and the other serves for adjusting or causing the abutting forces. Preferably arrangements are provided for varying the ratio of power transmission from said other part to the abutting mechanism driven thereby.

Another object of this invention is the provision of a sawing machine for stone, etc., having a saw chain in which each member carries a cutting tool and in which said tool is preferably mounted to the rear part of the member, whereby the angle enclosed by the line connecting the center of the rear chain bolt and the cutting edge of the tool and the line connecting the centers of the chain bolts is not greater than 120°.

A further object of the present invention resides in the provision of a sawing machine for stone etc. having a saw chain which is securely, glidingly, and/or rollingly conducted after leaving the material to be worked.

The cutting edges of the cutting tools are arranged substantially symmetrically with respect to the center line of the tools or teeth. The cutting edges are straight or convexly rounded and the cutting edges of the tools connected to one chain-link together form a convexly rounded contour. The individual teeth forming one cutting tool or tooth rest laterally on one another. The chain-links are provided with extensions of special configuration ahead of the cutting teeth with respect to the movement of the chain. These extensions preferably comprise rollers which are exchangeably connected with the chain-links. The chain-links preferably comprise laterally cranked parts, the fore part of which is bent inward and serves as inner link-plate, whereas the rear part is bent outward and serves as outer link-plate. Both parts belonging to one link may be rigidly connected, for example, welded to one another, leaving an opening between the parts which opening serves for inserting the cutting tooth. The teeth are adjustable with respect to their projection from the link. The trunk of a tooth and the face of a rest plate for the tooth inserted in the opening of the link may be provided with teeth, notches, and the like for definitely securing the position of the tooth relative to the link. The resets or the projections in the tooth matching with projections and resets in the rest plate are preferably so arranged that, when the plate is turned, i. e., inserted upside down to its former position, the elevation of the tooth above the link is changed by one half of the distance between two recesses or projections. Guide rollers are provided to guide and support the chain. Alternatingly there is one roller and a pair of rollers having the same axis so that the one roller moves partly in between the two rollers of an adjacent roller-pair and the distance between the axes of the rollers is smaller than the diameter of the rollers.

In a sawing machine according to my invention the proportion of the distances of the crests of the waves of the wavy cutting line on the material to be worked to the distance of the chain bolts is a fractional number and not an integer. Thereby, vibrations of the machine are reduced.

Further and other objects of the present invention will be hereinafter set forth in the specification and claims and shown in the drawings which, by way of illustration, show what I now consider to be a preferred embodiment of my invention.

In the drawings:

Fig. 1 is a sectional view of a machine according to the present invention taken along line 1—1 of Fig. 2.

Fig. 2 is a sectional view of a machine according to the present invention taken along line 2—2 in Fig. 1.

Fig. 3 shows a detail of the machine shown in Figs. 1 and 2.

Fig. 4 is a schematic showing of a modification of the abutting mechanism according to the present invention.

Fig. 5 is a schematic showing of another modification of an abutting mechanism according to the present invention.

Fig. 6 shows a modification of a sawing chain, whereby the chain slidingly moves between stationary guides.

Fig. 7 is a section of the arrangement shown in Fig. 6 and taken along line 7—7 of Fig. 6.

Fig. 8 is a top view of a chain which rollingly moves between stationary lateral guides.

Fig. 9 is a cross sectional view of the chain shown in Fig. 8 and taken along line 9—9 of Fig. 8.

Fig. 10 is a side view of a saw chain-link according to the present invention.

Fig. 11 is a vertical, longitudinal, sectional view of the link shown in Fig. 10 and taken along line 11—11 of Fig. 12.

Fig. 12 is a horizontal, longitudinal, sectional view of the link shown in Figs. 10 and 11 and taken along line 12—12 of Fig. 10.

Fig. 13 is a front view of a cutting tooth according to the present invention.

Fig. 14 is a front view of another cutting tooth according to the present invention.

Fig. 15 is a side view of a modified chain and support arrangement according to the present invention.

Like parts are designated by like numerals in all figures of the drawings.

Referring more particularly to Figs. 1 and 2 of the drawings: 1 is the casing which contains the vital parts of the driving mechanism and to which all other parts of the machine are connected. Casing 1 may be supported by a structure 2 and connected thereto, for example, by sliding parts 3 so that its elevation above the ground can easily be adjusted. The support structure 2 may be provided with rollers 4 running on rails 5 so that the whole machine can be advanced in accordance with the work of the saw. 5 represents the main driving motor which may be operated by a compressed gas or air or by a liquid under pressure or by electricity. To the shaft of motor 5 the main reduction gear 6 and the advance reduction gear 7 are connected. For convenience, only the casings of these conventional gears are shown. To the driven shaft 8 of the gear transmission 6 of a bevel gear system 9, 10 is connected. Shaft 8 is broken on Fig. 2 in order not to obscure the upper part of this figure. Bevel gear wheel 10 is connected to and drives a differential gear system comprising the bevel gear wheels 11, 12, 13, 14. The shafts of the intermediary bevel gears 12 and 13 rest in a fork 15 which is rigidly connected to a lever 16.

At the end of lever 16 an elongated opening 25 is provided which cooperates with pin 26 connected to pusher rod 27. The latter rests in bearings 28 and 29 which are connected to casing 1. One end of rod 27 carries a roller 30 which rollingly abuts the surface 31 of the material to be worked. Upon clockwise movement of lever 16 roller 30 is forced to the surface 31 of the material to be worked. Bearings 28 and 29 can be set anywhere in the elongated holes 28' and 29' of casing 1, whereby the acting length of lever 16 and the power transmitted thereby can be adjusted. This construction is shown in larger scale in Fig. 3. Bearing member 28 is provided with extensions 28'' which reach beyond the longitudinal side of hole 28' and can be screwed to casing 1. Wheel 14 is rigidly connected with and drives the driving wheel 17 for the saw chain 18. To chain 18 the cutting tools 18' are mounted. The saw chain itself and the mechanism for guiding it will be described later.

By means of shaft 19 gear transmission 7 drives a differential gear system 20 which is like system 11, 12, 13, 14. System 20 drives the winding drum 21 for the advance rope 22. One end of this rope is connected to a fixed point 23. Upon rotation of wheel 21 rope 22 is wound up and the whole machine, including saw chain 18, is advanced toward the fixed point 23. A lever 24 is connected to gear system 20 in the same manner as lever 16 is connected to system 11, 12, 13, 14. Lever 24 is provided with an elongated opening 33 which corresponds to opening 25 in lever 16. This opening is in cooperation with pin 34 of rod 35 which is like rod 27 and carries a roller 36 which rollingly abuts surface 31. The position of bearing 37 can be adjusted in an elongated hole 37' in the same manner as is the case with bearings 28 and 29.

The forces acting on the individual parts of the machine when the apparatus is in operation are as follows:

The intermediary wheels 12 and 13 transmit to fork 15 twice as much torque as to gear wheels 11 and 14. The force acting on rod 27 is in accordance with the length of lever 16. If, for example, lever 16 is twice as long as the radius of chain wheel 17, then power 0 acting on surface 31 is equal to the pulling force $p_2$ of chain 18.

The total cutting pressure $q$ can be divided into a force $p$ which is substantially equal to pulling force $p_2$ of chain 18 and into force $z$ which must be overcome by rope 22. Since the direction of force $z$ is not the same as that of rope 22 but parallel thereto, there is a tendency to turn the whole machine so that force $z$ acts in the direction of rope 22. This turning force is counterbalanced by means of the pusher rod 35 which, through roller 36, exerts a force $0^1$ to surface 31. By the use of two separate differential gear systems, one for the saw chain drive and one for driving the advance mechanism, the forces $z$ and $p$ which are of varying greatness are always counterbalanced in the correct proportion which is not the case, if, for example, the same differential gear system is used for driving the chain and the advance mechanism. Transmission systems 6 and/or 7 may be omitted or built into one unit with the differential gear systems. If the distance between the forces $z$ and $z_1$, which latter force acts in the direction of rope 22, is small, the pressure $0^1$ to be exerted by rod 35 and roller 36 is also small and in such case it is possible to omit gear system 20 with lever 24 and pusher 35 altogether.

Because the cutting pressure $p$ is transmitted back to the surface 31 of the material to be worked, the body of the machine with motors and gearings remains absolutely quiet. The machine can be placed on rails away from the wall having the surface 31; the track need not be anchored or stayed against surface 31. Roller 30 follows all projections and recesses of surface 31 without shaking the machine. There is the further advantage that cuts of any depth may be made with the same saw chain and chain support mechanism. The machine is placed at the desired distance from surface 31 and the pushers 27 and 35 are adjusted automatically to stabilize the machine.

Instead of using mechanical forces for adjusting the pushers 27 and 35, electrical forces may be used. An arrangement of this type is diagrammatically shown in Fig. 4. In this figure 38 is the motor, for example, for driving the wheel operating the saw chain. In the electric circuit supplying motor 38 with electric power a solenoid coil 39 is arranged. When much power is required, i. e., at great sawing resistance, the core 40 of this solenoid is pulled upward as seen in Fig. 4 and moves elbow lever 41 one arm of which is connected to core 40 in clockwise direction. Pusher 42 which is connected to the other arm of elbow lever 41 and is provided with a roller 43 is then forced against the surface 31 of the material to be worked. The solenoid acts against the tension of spring 44 which tends to pull pusher 42 away from the wall.

If a fluid motor, for example, a compressed air motor or a hydraulic motor of the rotary type is used for operating the sawing machine, the amount of fluid going through said motor is in proportion to the cutting resistance and an arrangement according to Fig. 5 may be used for operating the pusher. In Fig. 5 45 represents the motor for operating the sawing machine. Either in the fluid supply or in the fluid discharge line of this motor a Venturi tube 46 is provided. The throat of this tube is connected with one end of cylinder 47 and the wide end of Venturi tube 46 with the other end of cylinder 47. In cylinder 47 a piston 48 is arranged to which pusher rod 49 which carries a roller 50 is directly connected. At much flow through motor 45, i. e., at great cutting resistance, the difference of pressure between the two sides of piston 48 is great and rod 49 with roller 50 is pushed with great force against wall 31.

We now come to the description of the cutting chain with the saw members. In the chains according to Figs. 6 and 7 each link of the chain carries a cutting tooth. Thereby, the cutting pressure is equally distributed over the chain support 51 by means of the guide parts 52 which slide in grooves of equal shape provided in parts 51. The chain carriers guide the chain all along its working path. One half of the links comprise two parts 54, 55, whereby parts 54 and 55 are symmetric and support the cutting tool 56. In front of the cutting tool is a recess 57 and in front of this recess are rollers 58 and 59. The circumferential contours of these rollers are like sections of the cutting surface of cutter 56. These rollers prepare the way for the cutter and particularly prevent the cutters from cutting too deeply into the material. Wear and breakage of the cutters is thereby considerably reduced. The other half of the chain links consist of an element 61 which is arranged between members 54 and 55. Member 61 carries tooth 60 and in front of it the part 60′ for assuring that tooth 60 does not cut too deeply into the material.

Instead of a gliding motion of the chain within supports 51, a rolling motion is preferred. Such a mechanism is shown in Figs. 8 and 9. There are inner links consisting of link plates 62 and 63 and outer links which consist of link plates 64 and 65. Bolts 66 pairwise connect the inner and outer links and support rollers 67 which roll in a suitable groove in the lateral stationary support parts 68 and 69. The upper or rather the outer part of the outer link members is provided with a frame part 64′, and 65′ which frame parts are pairwise welded together so that openings are formed for inserting a tooth support to which the cutting tooth is connected. With the inner link plates a support 70 may be rigidly connected and teeth 71 and 72 may be removably secured thereto.

Instead of rigidly guiding the chain all along its way and particularly adjacent to the cutting line, it may be supported and guided by guide rollers as is shown in Figures 1 and 2. The chain-links and cutters used in this construction are illustrated in Figures 10 to 14 inclusive. Other chain constructions for example as shown in Figures 8 and 9 can be used just as well. In the construction shown in Figures 1 and 2 two sets of support rollers are employed: the single rollers 73 and the double rollers 74, which latter each consist of a pair of rollers which overlap the adjacent single rollers on both their sides. All rollers are supported by stationary support plates 75 which are arranged on both sides of the rollers. Rollers 73 are provided with teeth which fit in between the clearances between the chain bolts 76 and 77. Rollers 74 have a circumferential contour which is adapted to abut the lower surface of the chain-links and to carry the links in this manner.

The chain-links shown in detail in Figs. 10 to 14, inclusive, are particularly suitable for narrow chains which may also be used for cutting steel. The forward part of the link plates 78 is bent inward and serves as inner link plate, whereas the rear part serves as outer link plate. The distance of the plates between the two bolts 76 and 77 is equal, whereby good fitting and lateral support of the links by the rollers is assured. The upper part of the links is provided with a rim 79 which projects inward.

The rims of pairs of links may be welded together and form a cover protecting the interior of the chain from saw dust. The rear portions of the link plates and rims project upward and are provided at this point with an opening 80 the center of which is slightly behind the center line of the rear link bolt 77. Opening 80 corresponds to the openings left by the frame parts 64′, 65′ in Fig. 8. The cutting teeth consist of a cutting edge 81 of special steel and the holder 82. Preferably a rest plate 83 is provided between holder 82 and the frame 84. This rest plate is forced against the holder by means of a screw 85. The rest plates are provided with projections 86 which fit into conforming recesses of the front part of holder 82 and/or with bores 87 into which pins connected with holder 82 fit. These projections and recesses and/or bores may be arranged in such a manner that, when turning the rest plate 180° around bolt 85, the elevation of the cutting edge above the link plate can be changed by half the distance between the two projections.

It is advisable to use as many and as large guide rollers as possible. The teeth of the single wheels 73 reach deep into the interior of the chain and the face of the teeth about the lower surface of the rim 79 at point 88, which is beyond the line connecting the centers of the bolts 76 and 77 and as close as possible to the cutting line 89. Thereby the cutting pressure is taken up by the rollers 73 at point 88 and a good guiding and reliable cutting operation is assured. With wide chains the bushings 94 may abut the bottom of the spaces of the teeth and the cutting pressure be taken up in this manner. The proportion of the distance T of the wave crests of the wavy cutting line 89 of the material 90 to be cut to the distance of the chain bolts should never be an integer but always a fractional number. Otherwise at one moment all teeth would work against the wave crests of the cutting line and at the next moment against the troughs of the waves. This would cause vibrations of the machine.

It is desirable that the individual links are closely adjacent to one another at all operating conditions and that there is only a small clearance between the chain and the material which is cut. The latter is accomplished by providing longitudinal projections 91 on the outer sides of the link plates. The rear part of the link plates is convexly rounded and runs close to the concavely rounded or pointed front part of the projection 91 also when two adjacent links form an angle with each other. The front part of the inwardly projecting rims 79 is curved downward and there is a small step 92 at the beginning of this curvature into which a nose 93 of the adjacent link plate matches, whereby also a good closure is assured at all operating positions of the links and entrance of dust into the interior of the chain is prevented. The abutments 92, 93 also assure that the chain can assume a straight line but cannot bend upward and form cavities.

It is important that the angle $t$ enclosed by the line connecting the cutting edge of the tooth and the center of the adjacent link bolt 77 with the rearward continuation of the line connecting the center of the link bolts is not greater than 105°. If for any reason a tooth cuts deeper into the material to be cut than the adjacent teeth, the fore end of the link to which the tooth is connected tends to turn upward in the direction of the arrow A in Fig. 10. Thereby the links or link ahead of the one under consideration are also lifted and their teeth also cut deeper into the material, whereby the first mentioned tooth is relieved. The tooth is further relieved because it turns around pin 77, and as long as it normally stands perpendicular with respect to the line connecting the centers of the link bolts. If the angle enclosed by the line connecting the edge of the tooth with the center of pin 77 and the line connecting the centers of the link bolts is greater than 105°, undesirable additional pressure would be exerted on the tooth if the link moves in the direction of arrow A because of already too great a load on the tooth. This feature of my invention is particularly important when cutting material which is not homogeneous in its structure, for example, concrete or reinforced concrete, which materials assist turning up of the links because the teeth cut deeply into the material where it is soft and are then too deep when meeting a hard part in the material. In chains which are definitely guided over their whole path like the chain shown in Fig. 6 this feature is not so important. It is, however, important that the tooth is at the rear part of the link. If the tooth were located at the fore end of the link, it would not be relieved when cutting too deeply but would be pressed still deeper into the material, whereas the teeth in front and back of the tooth under consideration would be relieved instead of loaded.

With links and teeth constructed according to the present invention all turning or bending moments which are caused by the cutting pressure and produce uneven and one-sided loads on the chain and guides thereof are eliminated or rendered ineffective.

Figs. 13 and 14 show two types of teeth as they may be alternatingly used in chains as shown in the present application. The cutting edges are symmetric with respect to the center line of the tooth. The cutting pressures are equally transmitted to both sides of the tooth and tooth holder and partly balance each other. I have found by experiments that in materials of non-homogeneous structure such as concrete or reinforced concrete only cutting edges having a convexly rounded contour are suitable. This contour may be composed of a plurality of individual straight or partially rounded parts. By such configuration of the cutting tooth loose but hard parts of the material to be cut are pressed into the other material. With other shapes they are torn out of the material and damage the tooth.

Teeth according to Fig. 14 may be made up of two halves, i. e., be split along the center line. Preferably a tooth according to Fig. 13 is inserted in one link and a tooth according to Fig. 14 in the next adjacent link so that a cutting contour as shown in dotted lines in Fig. 14 is obtained. In certain cases it may be desirable not to insert a tooth into every link but to leave one or more links without teeth in between the links provided with teeth. This permits making the links smaller. Links having provisions as indicated by 92, 93 in Fig. 11 lend themselves particularly well to such use because they cannot be bent to form a concavity.

Instead of alternatingly arranging single and double guide rollers for carrying and guiding the saw chain, the double rollers may be omitted and only tooth rollers 73 used. The chain must then be sufficiently loose to operate along a wavy path as shown in Fig. 15. A lateral guide of the freely hanging parts of the chain is not necessary because the cutting pressure $z$ acts behind or below, as the case may be, a line connecting the supporting points C and D and stabilizes the chain, i. e., prevents lateral movement.

Referring again to Figs. 1 and 2 of the drawings, the arrangement shown in these figures is a combination of a saw chain supported and guided by support rollers and of a rigidly guided chain as shown in Figs. 6 and 7. The individual link members of the chain are shown in Figs. 10, 11, 12. As soon as the chain leaves the material to be worked, it enters the stationary lateral guides 51' which are provided with grooves 95 into which the lateral projections 91 fit. Groove 95 has a funnel-shaped entrance portion 96 to ease entrance of the chain. The guides 51' are connected with the plates 75 which support the rollers 73 and 74. Plates 75 are connected with casing 1 by means of links 97.

While I believe the above described embodiments of my invention to be preferred embodiments, I wish it to be understood that I do not desire to be limited to the exact details of method, design, and construction shown and described, for obvious modifications will occur to a person skilled in the art.

What I claim is:

1. A sawing machine having a plurality of double rollers each consisting of two individual rollers arranged on the same axis and having a space between them, a plurality of single rollers situated in substantially the same plane as said double rollers and alternatingly with said double rollers, whereby a continuous line of rollers is formed and said individual rollers of said double rollers overlap said single rollers on both sides thereof, a support means stationary in respect to said rollers and supporting said rollers, and a saw chain comprising a plurality of links and being located adjacent to a part of the circumference of said rollers and being guided and supported by said rollers.

2. A sawing machine having a plurality of double rollers each consisting of two individual rollers arranged on the same axis and having a space between them, a plurality of tooth-wheel-shaped single rollers situated in substantially the same plane as said double rollers and alternatingly with said double rollers, whereby a continuous line of rollers is formed and said individual rollers of said double rollers overlap said single rollers on both sides thereof, a support means stationary with respect to said rollers and supporting said rollers, and a saw chain comprising a plurality of links, each of said links comprising a pair of link plates and having a slot-shaped opening in between said plates for accommodating said single rollers, said double rollers supportingly abutting said link plates, whereby said chain is firmly supported and guided by said rollers.

3. A sawing machine having a saw chain laterally unguidedly moving through the material to be sawed, and guide means disposed adjacent to that part of said chain which does not work on the material to be cut for laterally positively guiding said chain as soon as it leaves the material to be cut.

4. A sawing machine according to claim 3 in which said saw chain is provided with projecting guide members and said guide means with guide grooves which cooperate with said guide members.

5. A sawing machine having a saw chain, a plurality of revolvable support means sideways overlapping one another and rollingly and substantially uninterruptedly supporting said chain.

6. A sawing machine having a saw chain, a plurality of substantially wheel shaped support means sideways overlapping one another and rollingly supporting said chain.

7. A sawing machine having a saw chain comprising a plurality of link members and bolt members movably interlinking said link members, a plurality of cutters equidistantly connected with said chain, a plurality of substantially wheel shaped support means overlapping one another and supporting said chain, the distance between said bolt members being smaller than the distance between the axes of rotation of said support means, whereby an undulating formation of said chain is produced.

8. A sawing machine having a saw chain comprising a plurality of link members and bolt members movably interlinking said link members, a plurality of cutters equidistantly connected with said chain, a plurality of substantially wheel shaped support means overlapping one another and supporting said chain, the distance between said bolt members being smaller than the distance between the axes of rotation of said support means, and the proportion of said two distances with respect to one another being a fractional number, whereby an undulating formation of said chain is produced and the location of said cutters with respect to the undulations of said chain is unsymmetric.

9. A sawing machine having a movable saw chain, support means which are stationary with respect to said chain, a plurality of substantially disk shaped members revolvably connected with said support means and disposed alternatingly with a plurality of wheel members which are also revolvably connected with said support means and which have annular recesses into which a circumferential part of said disk shaped members overlaps, said disk members and said wheel members supporting said chain.

10. A machine for cutting masonry, stones and the like having a saw chain in the form of an endless loop and comprising flat links and pins connecting said links and being stiff in one plane and secure against torsion and lateral movement, cutting members rigidly connected with said chain, a plurality of spaced guiding supports supporting said chain and being disposed along the working part of said chain, said chain sagging between pairs of said supports and assuming an undulating configuration when in operation, and all members of said chain including said cutting members moving in a plane through the workpiece whereby stiffness of said chain against torsion and lateral movement is increased.

11. A sawing machine having a cantilever member, a saw chain, a plurality of chain support means movably connected with said member, a chain housing associated with said member into which housing the chain moves after having left the workpiece, guide means connected with said chain, and guide means corresponding with said first mentioned guide means and being connected with said chain housing and positively guiding said chain after it has left the work material.

12. A sawing machine having a saw chain comprising a plurality of links, bolts movably connecting said links, at least three rollers rotatably supporting said chain along its cutting line and causing a wavy configuration of said line and wave crests therein, the quotient of the distance between the wave crests of said cutting line and the distance between said bolts being a fractional number.

13. A sawing machine having a saw chain, a chain support means, a plurality of rollers rotatably mounted to said support means and supporting said chain along the workpiece; said chain sagging between said rollers and having an undulated configuration and producing a wavy cutting line in the material which is cut by said saw chain, and being stabilized in between two of said rollers by the cutting pressure acting on said chain between said rollers.

14. In a saw chain a plurality of individual links, each link comprising two link bolts and a pair of like side members spaced apart and rigidly connected with one another and revolvably connected with the side members of the adjacent links by means of said link bolts, a cover covering the upper part of the space between said side members and being curved at one end over one of said link bolts and extending underneath the cover of the adjacent link and preventing saw dust from falling in between said side members also when said links are in inclined position with respect to one another.

15. A saw chain having a plurality of chain link members interconnected by link pins, a cutting tooth mounted on each of said members and having a cutting edge disposed substantially above the rear link pin of the individual member on which said tooth is mounted, the angle formed by the line connecting said cutting edge and the center of the rear link pin above which said cutting edge is disposed, and the rearward continuation of the line connecting the centers of the link pins of the link member to which said tooth is mounted being between 90 and 105°.

16. A link member for a saw chain comprising a pair of spaced apart and symmetrically alike side parts, a cover covering the upper part of the space between said side members, a link pin disposed at one end of said link member for connection thereof to an adjacent link member, said cover having a curved portion extending over said link pin and underneath the cover of an adjacent link member for preventing saw dust from falling in between said side members also when said link members are in inclined position with respect to one another.

17. A link member for a saw chain comprising a pair of spaced apart and symmetrically alike side parts, a cover covering the upper part of the space between said side members, a link pin disposed at one end of said link member for connection thereof to an adjacent link member, said cover having a curved portion extending over said link pin and underneath the cover of an adjacent link member for preventing saw dust from falling in between said side members also when said link members are in inclined position with respect to one another, a bore disposed at the other end of said link member for receiving the link pin of another adjacent link member, and a cutting tooth extending substantially above said bore.

LUDWIG LACHER.